(12) United States Patent
Walp et al.

(10) Patent No.: US 8,602,517 B2
(45) Date of Patent: Dec. 10, 2013

(54) MECHANISM FOR TRACKING PRINT SYSTEM ENERGY USAGE

(75) Inventors: Jason C. Walp, Louisville, CO (US);
James A. Chauvin, Frederick, CO (US);
Nicholas J. Ciocco, Boulder, CO (US);
Scott D. Mastie, Longmont, CO (US)

(73) Assignee: InfoPrint Solutions Company LLC, Boulder, CO (US)

(*) Notice: Subject to any disclaimer, the term of this patent is extended or adjusted under 35 U.S.C. 154(b) by 467 days.

(21) Appl. No.: 13/004,489

(22) Filed: Jan. 11, 2011

(65) Prior Publication Data

US 2012/0176434 A1 Jul. 12, 2012

(51) Int. Cl.
*B41J 29/38* (2006.01)

(52) U.S. Cl.
USPC .......................................................... 347/16

(58) Field of Classification Search
USPC .......................................................... 347/16
See application file for complete search history.

(56) References Cited

U.S. PATENT DOCUMENTS

| | | | |
|---|---|---|---|
| 5,168,811 A | 12/1992 | Cox et al. | |
| 5,349,905 A | 9/1994 | Taylor et al. | |
| 5,699,493 A * | 12/1997 | Davidson et al. | 358/1.15 |
| 6,072,585 A | 6/2000 | Dutton et al. | |
| 6,457,801 B1 | 10/2002 | Fish et al. | |
| 7,517,075 B2 | 4/2009 | Smith et al. | |
| 7,519,837 B2 | 4/2009 | Smith et al. | |
| 2007/0153074 A1 | 7/2007 | Anderson et al. | |
| 2009/0085954 A1 | 4/2009 | Kubota et al. | |

FOREIGN PATENT DOCUMENTS

JP 2009/076003 4/2009

OTHER PUBLICATIONS

"PCT Search Report and Written Opinion", PCT/US2012/020472, (Mar. 21, 2012), 1-12.

* cited by examiner

*Primary Examiner* — Uyen Chau N Le
*Assistant Examiner* — Kajli Prince
(74) *Attorney, Agent, or Firm* — Blakely, Sokoloff, Taylor & Zafman LLP

(57) ABSTRACT

A printer is disclosed. The printer includes one or more sub-systems having a capability of a different magnitude of operation based on print job properties and a controller. The controller includes a monitor to track a first operation time for each of the sub-systems during printing of a first print job and track a second operation time for each of the sub-systems during printing of a second print job.

14 Claims, 2 Drawing Sheets

MECHANISM FOR TRACKING PRINT SYSTEM ENERGY USAGE

FIELD OF THE INVENTION

The invention relates to the field of printing systems, and in particular, to management of printing systems.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. The printing software may simultaneously manage in excess of thousands of print jobs that have been spooled (or queued) for production. One type of printer management is the accounting and management of printer resource consumption.

In order for the operator of inkjet printing system to be adequately compensated for producing print jobs it is necessary to monitor resource consumption associated with a particular print job. Currently, print engines within printing systems have the ability to report constant counter-based values on a print job basis to the printing software. These values include information such as job start/stop time, number of errors encountered, stops/starts, ink usage, and page count. Each of these items is an additive value, where a counter is kept and reported.

However some systems within a printing system are variable in that they may be on or off for different durations during the printing of a specific job. For instance, an ink dryer is the largest consumer of energy within inkjet printing systems. The operation of an ink dryer may vary widely between different print jobs, making it difficult to track dryer energy consumption attributable to individual print jobs. Thus, achieving an accurate reporting for energy consumption attributable variable systems is difficult.

Accordingly, a mechanism for tracking and reporting variable energy usage associated with producing a print job is desired.

SUMMARY

In one embodiment, a printer is disclosed. The printer includes one or more sub-systems having a capability of a different magnitude of operation based on print job properties and a controller. The controller includes a monitor to track a first operation time for each of the sub-systems during printing of a first print job and track a second operation time for each of the sub-systems during printing of a second print job.

In another embodiment, a method is disclosed. The method includes receiving a first print job at a printer having one or more subsystems having a capability of a different magnitude of operation based on print job properties, monitoring a first operation time for each of one or more sub-systems during printing of the first print job, receiving a second print job at the printer and monitoring a second operation time for each of one or more sub-systems during printing of a second print job at the printer In yet another embodiment, a printing system is disclosed. The printing system includes a server having a printing software product and a printer, communicatively coupled to the server. The printer includes one or more sub-systems having a capability of a different magnitude of operation based on print job properties and a controller. The controller includes a monitor to track a first operation time for each of the sub-systems during printing of a first print job and track a second operation time for each of the sub-systems during printing of a second print job.

BRIEF DESCRIPTION OF THE DRAWINGS

A better understanding of the present invention can be obtained from the following detailed description in conjunction with the following drawings, in which.

DETAILED DESCRIPTION

A mechanism for tracking and reporting variable energy usage associated with producing a print job is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
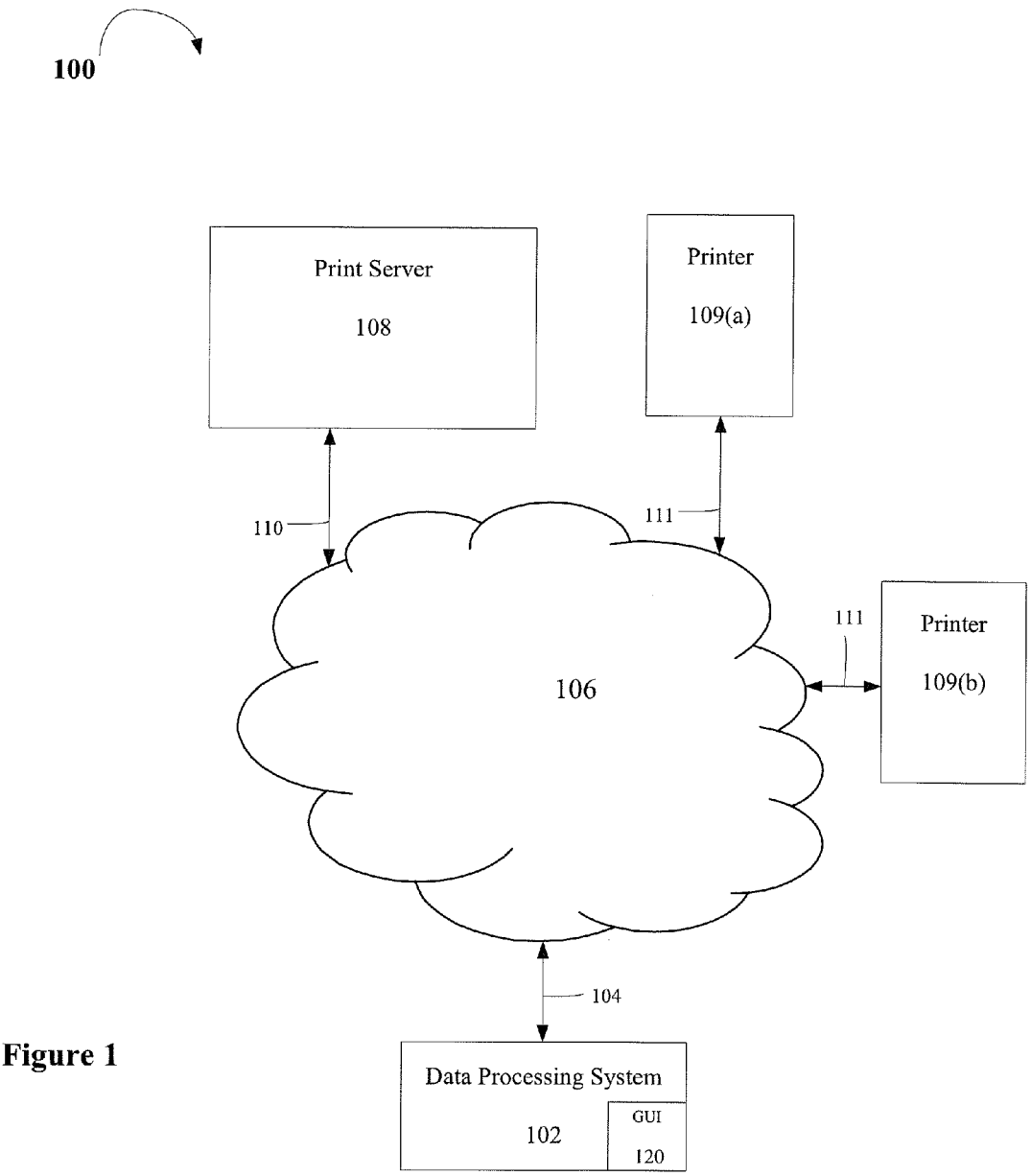
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

Although described as separate entities, other embodiments may include print server 108 being incorporated in one or more of the printers 109. However in other embodiments, the print server and printer may be physically separate entities. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages the printing of documents from multiple data processing systems 102 to the one or more printers 109.

In a further embodiment, the printing software product may be implemented using either InfoPrint Manager (IPM) or InfoPrint ProcessDirector (IPPD), although other types of printing software may be used instead. In yet a further embodiment, the print application at data processing system 102 interacts with the printing software product to provide for efficient transmission of print jobs. In one embodiment, the printing software product communicates with printers 109 via a SNMP network management protocol.

Figure 2:
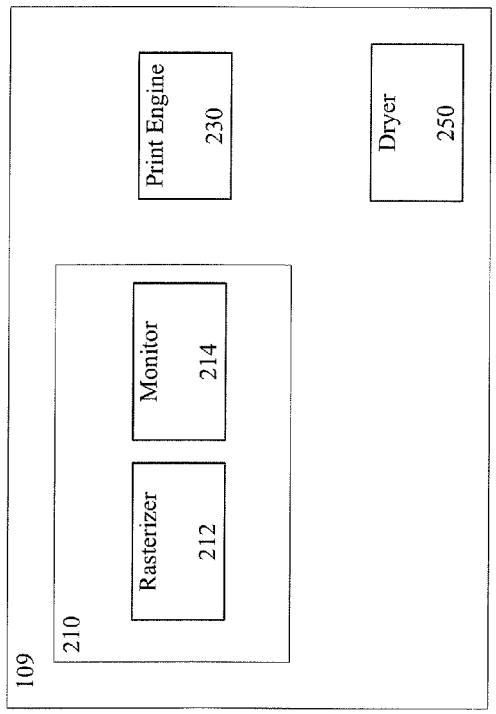
FIG. 2 illustrates one embodiment of a printer.

FIG. 2 illustrates an embodiment of a printer 109. Printer 109 includes a control unit 210 and a print engine 230. According to one embodiment, control unit 210 processes and renders objects received from print server 108 and provides sheet maps for printing to print engine 230. Control unit 150 includes a rasterizer 212 that is implemented to process image objects received at control unit 150 by performing a raster image process (RIP) to convert an image described in a vector graphics format (e.g., shapes) into a raster image (e.g., pixels) for output to print engine 230.

In one embodiment, print engine 230 includes one or more fixed, wide-array inkjet print head having one or more nozzles that are implemented to spray droplets of ink onto a medium (e.g., paper) in order to execute a print job. However, print engine 230 may include other types of ink jet print heads, as well as a moving print head design.

Control unit 210 also includes a monitor 214 that monitors resources consumed for each print job printed at printer 109. In one embodiment, monitor 214 tracks the usage of variable sub-systems within printer 109. In such an embodiment, variable sub-systems include those that may incur different magnitudes of operation time during each print job depending on the properties of a particular print job. For example, print engine 230 will incur more operation time during a large print job than during a small print job. Thus, by tracking the operation time of print engine 230 during each print job the energy consumed by each of the print jobs can be calculated and reported.

In a further embodiment, monitor 214 tracks the operation time of an ink dryer 250 that is implemented to dry ink applied by print engine 230 to the medium. During printer 109 operation, dryer 250 is heated up to the specified temperature as a job is printed. Further, energy is transferred, based on ink coverage and the medium properties, as the medium and ink pass over dryer 250. This causes dryer 250 to cool. As dryer 250 cools the heaters are to be turned back on in order to maintain the temperature at a specified temperature range. Thus, heavy ink coverage requires dryer 250 to be turned on more frequently than lower ink coverage, causing the power to vary.

In one embodiment, monitor 214 tracks the on/off status of dryer 250 over time to acquire a total duration of operation time. In such an embodiment, monitor 214 monitors the total amount of time the dryer 250 heaters are active during a print job. The active time of the heaters directly correlates to the amount of energy used by dryer 250 during a print job, which in turn has a direct impact to the cost of energy used to print the job. Since power usage at dryer 250 is linear related to the active dryer time, power consumption can easily be calculated. In one embodiment, power consumption for a print job is calculated at control unit 210 before being reported to the printing software product, along with other print job information.

However in other embodiments, the duration of active dryer 250 time is forwarded to the printing software product, which calculates the power consumption. Subsequently, the printing software product generation of a report results regarding the usage of printer 109. The report may be incorporated into a maintenance billing report for printer 109. In another embodiment, monitor 214 also tracks the status of print engine 230 and other systems (e.g., processing power) at printer 109 to acquire a total duration of active time.

Figure 3:
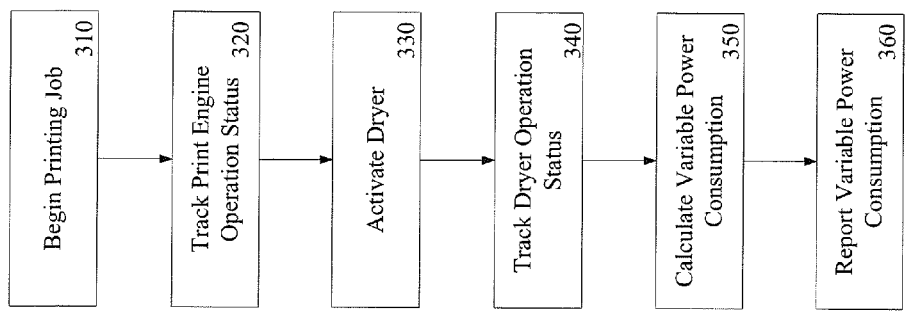
FIG. 3 is a flow diagram illustrating one embodiment for tracking energy consumption within a printer.

FIG. 3 is a flow diagram illustrating one embodiment for tracking variable energy consumption at printer 109. At processing block 310, a print job begins printing at print engine 230. At processing block 320, monitor 214 begins tracking the status of print engine 230. As discussed above, monitor 214 tracks the duration of active operation time for print engine 230.

At processing block 330, dryer 250 is activated. At processing block 340, monitor 214 begins tracking the status of dryer 250. Once print engine 230 and dryer 250 operation have been completed, control unit 210 calculates power consumption for print engine 230, dryer 250 and other variable components within printer 109, processing block 340. At processing block 350, the calculated power consumption values are forwarded to the printing software product.

The above described mechanism integrates variable systems, such as print engine and dryer state, over time to collect a total usage amount which could be reported along with counter-based job information.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printer comprising:
    two or more sub-systems each having a capability of a different magnitude or operation based on print job properties, including:
    A first sub-system having an ink dryer; and
    a controller having a monitor to track a first operation time for the ink dryer during printing of a first print job and a second operation time for the ink dryer during printing of a second print job, and calculate a first power usage incurred by the ink dryer based on the first operation time and a second power usage incurred by the ink dryer based on the second operation time.

2. The printer of claim 1 wherein the monitor tracks the operation time for the ink dryer by tracking an on/off status of the ink dryer during a print job.

3. The printer of claim 1 wherein a second sub-system comprises a print engine and the monitor tracks a first operation time for the print engine during printing of the first print job and a second operation time for the print engine during printing of the second print job.

4. The printer of claim 3 wherein the monitor calculates a first power usage incurred by the ink dryer and the print engine based on the first operation times and a second power usage incurred by the ink dryer and the print engine based on the second operation time.

5. The printer of claim 4 wherein the monitor reports the first power usage and the second power usage to a print server.

6. A method comprising:
receiving a first print job at a printer;
monitoring a first operation time for an ink dryer during printing of the first print job;
receiving a second print job at the printer;
monitoring a second operation time for the ink dryer during printing of a second print job at the printer;
calculating a second power usage incurred by the ink dryer based on the second operation time.

7. The method of claim 6 wherein monitoring the operation time for the ink dryer comprises tracking an on/off status of the ink dryer during a print job.

8. The method of claim 6 further comprising:
monitoring a first operation time for the print engine during printing of the first print job; and
monitoring a second operation time for the print engine during printing of the second print job.

9. The method of claim 6 further comprising:
calculating a first power usage incurred by the ink dryer and the print engine based on the first operation times; and
calculating a second power usage incurred by the ink dryer and the print engine based on the second operation times.

10. The method of claim 9 further comprising reporting the first power usage and the second power usage to a print server.

11. A printing system comprising:
a server comprising a printing software product; and
a printer, communicatively coupled to the server, including:
two or more sub-systems each having a capability of a different magnitude of operation based on print job properties, including:
a first sub-system having an ink dryer; and
a controller having a monitor to track a first operation time for the ink dryer during printing of a first print job and a second operation time for the ink dryer during printing of a second print job, and calculate a first power usage incurred by the ink dryer based on the first operation time and a second power usage incurred by the ink dryer based on the second operation time.

12. The printing system of claim 11 wherein a second sub-system comprises a print engine and the monitor tracks a first operation time for the print engine during printing of the first print job and a second operation time for the print engine during printing of the second print job.

13. The printing system of claim 12 wherein the monitor calculates a first power usage incurred by the ink dryer and the print engine based on the first operation times and a second power usage incurred by the ink dryer and the print engine based on the second operation time.

14. The printing system of claim 13 wherein the monitor reports the first power usage and the second power usage to the printing software product.

* * * * *